United States Patent [19]

Chu

[11] Patent Number: 4,688,348
[45] Date of Patent: Aug. 25, 1987

[54] ANIMAL TRAP WITH ROTATIVE TANGENTIAL DOORS

[76] Inventor: Alan C. Chu, 2437 East Lincoln Ave., Anaheim, Calif. 92806

[21] Appl. No.: 890,781

[22] Filed: Jul. 7, 1986

Related U.S. Application Data

[63] Continuation-in-part of Ser. No. 751,505, Jul. 2, 1985.

[51] Int. Cl.⁴ .......................................... A01M 23/20
[52] U.S. Cl. .......................................... 43/61; 43/62
[58] Field of Search ............................... 43/61, 60, 62

[56] References Cited

U.S. PATENT DOCUMENTS

| | | | |
|---|---|---|---|
| 222,520 | 12/1879 | Marti | 43/61 |
| 1,648,160 | 11/1927 | Boedecker | 43/62 |
| 2,038,068 | 4/1936 | Wagner | 43/61 |
| 2,232,604 | 2/1941 | Helmick | 43/61 |
| 2,540,418 | 2/1951 | Bird . | |
| 4,550,523 | 11/1985 | Spiller . | |

FOREIGN PATENT DOCUMENTS

| | | | |
|---|---|---|---|
| 593752 | 3/1934 | Fed. Rep. of Germany | 43/61 |
| 3948 | of 1889 | United Kingdom | 43/61 |

*Primary Examiner*—Nicholas P. Godici
*Assistant Examiner*—G. M. Reid

[57] ABSTRACT

An animal trap with rotative tangential doors comprises a main body (1) of open tubing pivoted with rotative tangential doors (2) which are positioned at each of said main body's two openings. Each door is controlled by a latch (4) located at the top of the tubing. At the middle of the body a trigger (3) is suspended by a clamp which is made by hooking both latches with a spring (6). When an animal steps on the lower rim of the trigger, its weight will cause the trigger to drop, thus causing movement of both latches and the simultaneous closing of both doors. The trap is provided with a pair of instant door locks (5) which would prevent the reverse rotation of each of the doors.

3 Claims, 5 Drawing Figures

U.S. Patent  Aug. 25, 1987  4,688,348
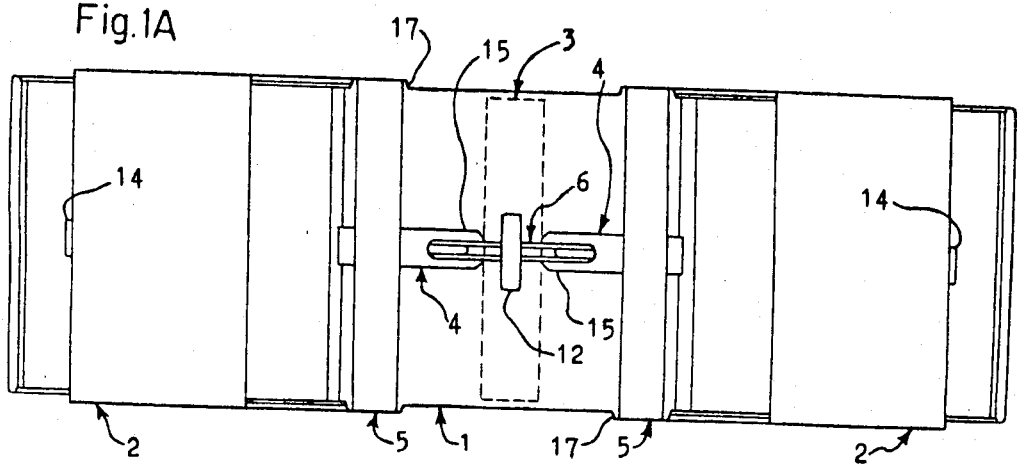
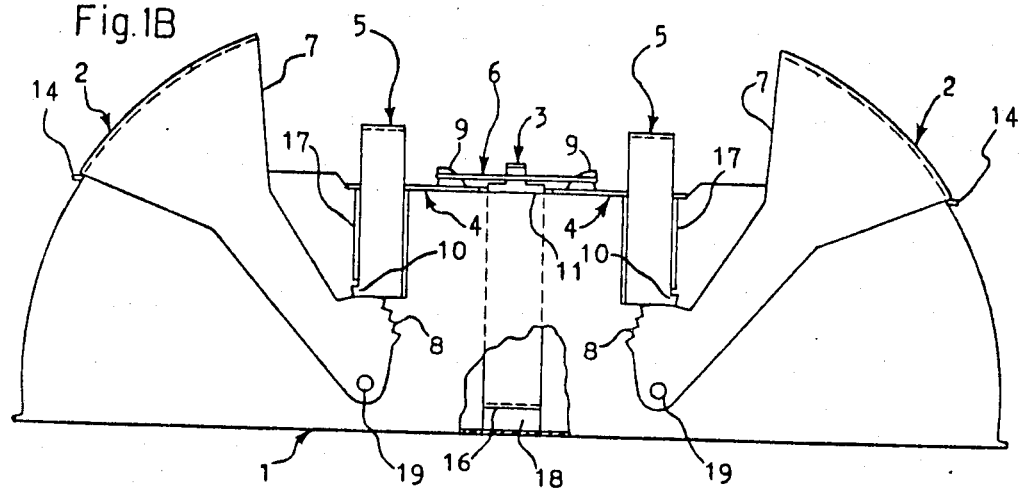
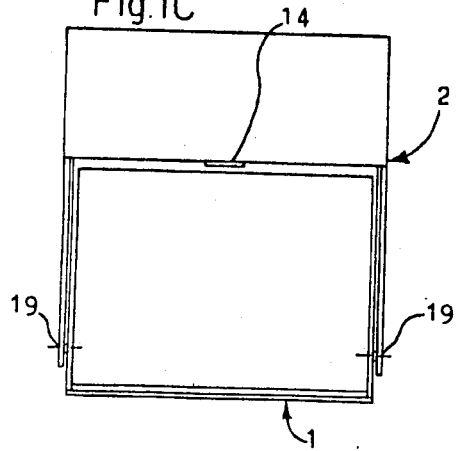
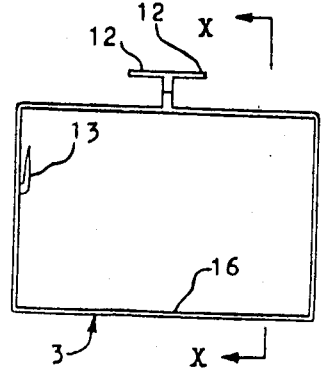
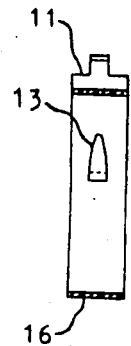

ANIMAL TRAP WITH ROTATIVE TANGENTIAL DOORS

This is a continuation-in-part of prior pending application Ser. No. 06/751,505 filing date 07/02/85.

BACKGROUND OF THE INVENTION

The existing mouse or animal traps, while having certain advantages, are not yet perfect for the purpose.

SUMMARY OF THE PRESENT INVENTION

In order to improve on the prior art of mouse or animal trapping, this invention provides a simple and effective animal trap which has two rotative tangential doors to alleviate the fear of entrapment held by mice or certain other animals. This trap can be used with or without bait.

DESCRIPTION OF THE DRAWING FIGURES

FIG. 1A is the top view of this invention.

FIG. 1B is the front view of this invention with side wall partially removed to show the trigger mechanism in setting position.

FIG. 1C is the side view of this invention.

FIG. 2A is the front view of the trigger.

FIG. 2B is the side view of the trigger taken along line X—X of FIG. 2A.

DESCRIPTION OF THE ILLUSTRATED EMBODIMENT

This invention comprises a main body (1), two rotative tangential doors (2), a trigger (3), two latches (4), two instant door locks (5), and a spring (6). Except for the spring which could be made of rubber or steel, all the other parts are preferably molded in plastic. They can also be made from die casting, sheet metal stamping, wire nets, or from other materials.

The main body (1) is generally a tubing with a rectangular cross-section, and each open end of this main body is pivoted with a rotative tangential door (2) which is positioned horizontally. A rectangular hole at each top end of the main body (1) is provided for the engagement of latch end (14) that controls the dropping of the door.

The rotative tangential door (2) although prefer to be arc-shaped, they can be made in other kinds of shape as long as no part of door plate would be facing against the path of rotation to create air resistance during closing or becoming a slam door. On both ends of each door is a rotating arm (7) formed with a pivot (19) and a set of step gears (8) which controls the proper operation of the door. This rotating arm has no extension that would touch the ground in anytime. The inside surface of this door need not be smooth, especially when made by wire nets.

The trigger (3) is a rectangular ring which matches the grooves (18) on the side walls of the main body at center. On top of the trigger is a stopper (11) against which the latch heads (15) are placed. Each latch (4) is a flat and long rectangular bar that contains a spring hook (9) on the top. When spring (6) is attached with these hooks to become a clamp, the whole trigger can be suspended inside the main body. On one side of the trigger is a bait hook (13) to which bait can be attached, if bait is to be used. On top of the stopper is a pair of lifting arms (12) for easy lifting of the trigger during in setting of the trap.

When a mouse or animal steps on any part at the lower rim (16) of the trigger, its weight will overcome the clamping force of the spring and cause the trigger to drop. Without the stopping action of the stopper, the latch heads (15) will move forward, resulting in the disengagement of the latch ends (14) and the closing of both doors. Since both latches are operated by the same trigger, they are subject to the same type of action and can thus close simultaneously.

The instant door lock (5) is U-shaped and is guided by rails (17) for up or down movement only. At the bottom of each arm of this lock is a stop gear (10) which matches the step gears (8) at one of each rotating arm (7) on the doors. The mechanism of the stop gear and the step gears will limit the door movement to only the downwards direction unless the stop gear is first disengaged from the step gears by lifting the instant door lock (5).

In setting the trap, the instant door lock (5) and the rotative tangential door (2) are first fully opened, then the latch end (14) is pushed out against the lower edge on each of the doors. Finally, the trigger is lifted and set by hooking the spring (6) onto the spring hooks (9).

I claim:

1. An animal trap which can catch animals alive and can be used with or without bait, said animal trap comprising:

(i) a generally tubular body, said body open at both ends;

(ii) a pair of rotative tangential doors, each of said doors fitted with a pair of arms, said arms being pivotally mounted on said tubular body to rotatively carry said doors in a circular arc about said pivotal mountings;

(iii) a trigger mechanism, said trigger mechanism operative to hold said doors in a first position wherein said ends of said tubing are not covered by said doors and said animal is free to enter either of said open ends of said tubing and said trigger mechanism is further operative to release said doors simultaneously so said doors in a second position cover said ends of said tubing when said animal comes into contact with a portion of said trigger mechanism thus catching said animal in said trap; and (iv) a locking mechanism for locking said doors in said closed position and for preventing a reverse rotation of said doors by said animal wherein said door moves from said second position to said first position, said locking mechanism includes a set of gear teeth which includes a plurality of teeth integrally formed on each of said arms, and said locking mechanism further includes at least one linear sliding element for each set of teeth said linear sliding element is constrained to linear movement by rail means, and each of said sliding elements includes a tooth portion, wherein each of said set of gear teeth have its corresponding sliding element arranged such that said tooth of said sliding element engages said set of gear teeth when said door travels from said first position to second position thus preventing reverse rotation.

2. The trap of claim 1, wherein said trigger mechanism includes a rectangular ring suspended by a clamp, and said clamp comprises two latches joined together by a spring member, wherein a first end of one of said latches is adapted to hold one of said doors in said first position and a first end of the other of said latches is adapted to hold the other of said doors in said first position and a second end of each of said latches can be brought into contact with the rectangular ring and said spring member attached proximal to each of said second ends of said latches such that said spring member urges the second end of each of said latches together to apply a clamping force to said ring member and hold the ring therebetween, said trigger mechanism can thus be arranged so that when said animal steps on said rectangular ring, said ring disengages from said clamp freeing said latches to move under the force of said spring member and said latches in turn free said doors to travel from said first position to said second position.

3. The trap according to claim 1, wherein the linear sliding elements associated with each door are joined together by a cross element, forming a U-shaped member, and each of said U-shaped member serve to prevent reverse rotation of its associated door.

* * * * *